United States Patent [19]

Ito et al.

[11] Patent Number: 5,757,153
[45] Date of Patent: May 26, 1998

[54] CONTROL SYSTEM FOR ELECTRIC VEHICLE

[75] Inventors: Hisahiro Ito; Tomoyuki Itoh; Shinji Yoshikawa; Yuji Saito. all of Wako, Japan

[73] Assignee: Honda Giken Kogyo Kabushiki Kaisha. Tokyo, Japan

[21] Appl. No.: 783,309

[22] Filed: Jan. 10, 1997

[30] Foreign Application Priority Data

Jan. 11, 1996 [JP] Japan ................... 8-003307

[51] Int. Cl.$^6$ ................... H02P 5/41; B60L 3/00
[52] U.S. Cl. ................... 318/370; 318/139; 318/587; 364/424.08; 180/65.1; 180/167; 74/866
[58] Field of Search ................... 318/139, 560–696, 318/370–389; 364/424.1, 424.06, 424.01, 424.03; 180/65.1, 167, 168, 169, 243; 74/866

[56] References Cited

U.S. PATENT DOCUMENTS

| | | |
|---|---|---|
| 4,691,285 | 9/1987 | Takeda ................... 364/424.1 |
| 4,744,031 | 5/1988 | Takeda et al. ................... 364/424.1 |
| 5,367,455 | 11/1994 | Kitagawa et al. ................... 364/424.01 |
| 5,696,680 | 12/1997 | Ichioka et al. ................... 364/424.096 |

*Primary Examiner*—Paul Ip
*Attorney, Agent, or Firm*—Nikaido, Marmelstein, Murray & Oram LLP

[57] ABSTRACT

In an electric vehicle including a transmission provided between a motor and driven wheels, if a shift change detecting means has detected the shift change from a "D" range or an "R" range to an "N" range or a "P" range when a stoppage detecting means has detected that the vehicle is in its substantially stopped state, a torque command value gradually-decreasing means gradually decreases the torque command value for the motor toward zero. This causes the face pressure of meshed portions of gears within the transmission to be moderately decreased, thereby preventing the generation of a striking sound due to a repulsion of the gear.

12 Claims, 8 Drawing Sheets

During traveling of vehicle in "D" range

Driving gear  Follower gear

FIG.8B

During stoppage of vehicle in "D" range

Driving gear  Follower gear(inoperative)

FIG.8C

"D" range → "N" or "P" range
during stoppage of vehicle

Driving gear  Follower gear(inoperative)

CONTROL SYSTEM FOR ELECTRIC VEHICLE

BACKGROUND OF THE INVENTION

1. Field of the Invention

The present invention relates to a control system for an electric vehicle in which a driving force of a motor is transmitted through a gear to driving wheels.

2. Description of the Related Art

In general, a shifting device for an electric vehicle includes four shift positions including a drive range (a "D" range), a reverse range (an "R" range), a neutral range (an "N" range), and a parking range (a "P" range). In the "D" and "R" ranges, the motor is driven to cause the vehicle to travel forwards or backwards. In the "N" range, the output from the motor is decreased to zero. In the "P" range, the output from the motor is decreased to zero and further, the rotation of the motor is locked.

If a shift change is conducted from the "D" range or the "R" range to the "N" range during traveling of the vehicle, the gears of the transmission or differential will not generate a striking sound. However, if the shift change is conducted from the "D" range or the "R" range to the "N" range or the "P" range during stoppage of the vehicle, a striking sound is generated.

Figure 8A:
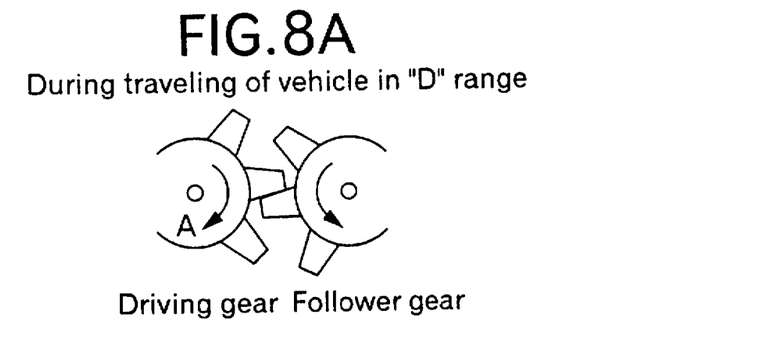
FIGS. 8A to 8C are illustrations to explain a reason for the striking sound of the gears to be generated in a conventional arrangement.

The reason will be described with reference to FIGS. 8a, 8b and 8c. As shown in FIG. 8a, during traveling of the vehicle with an accelerator opened in the "D" range, a driving gear connected to the motor is transmitting a driving torque in a direction of an arrow A to a follower gear connected to wheels. Tooth flanks of the driving and follower gears are in close contact with each other to generate no striking sound. During regenerative operation with the accelerator closed, the follower gear transmits a regenerative torque to the driving gear; the tooth flanks of both gears are in close contact with each other to generate no striking sound. When the shift change is conducted from the "D" range to the "N" range during traveling of the vehicle, the follower gear is rotated and therefore, even if the driving torque applied to the driving gear disappears, the tooth flanks of both the gears are already in close contact with each other and, therefore, will not generate a striking sound.

Figure 8B:
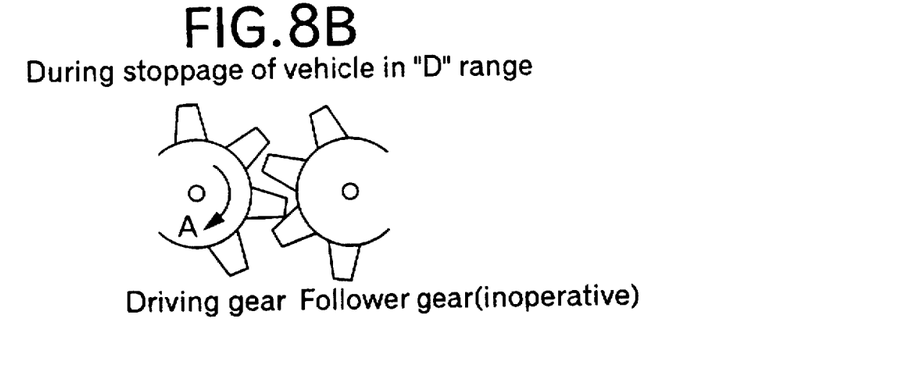
Figure 8C:
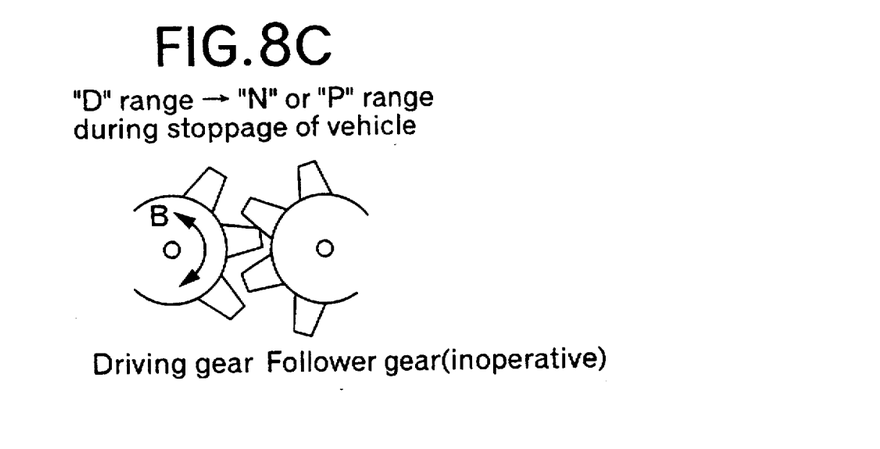

On the other hand, as shown in FIG. 8b, during stoppage of the vehicle in the "D" range, a driving torque in a direction of an arrow A determined by the accelerator opening degree (a creep torque at the time when the accelerator is fully closed) is transmitted from the driving gear to the follower gear. The tooth flanks of both the gears are brought into close contact with each other and, therefore, do not generate a striking sound. However, as shown in FIG. 8c, when the shift change is conducted from the "D" range to the "N" range or to the "P" range during stoppage of the vehicle in the "D" range, the driving gear is pushed back by an amount corresponding to a backlash by a reaction force in a direction of an arrow B received from the inoperative follower gear at the instant when the driving torque applied to the driving gear disappears, because the follower gear is inoperative. Then, the driving gear generates a striking sound by striking against the follower gear. Even when the shift change is conducted from the "R" range to the "N" range or to the "P" range during stoppage of the vehicle in the "R" range, the striking sound is generated for the same reason.

SUMMARY OF THE INVENTION

Accordingly, it is an object of the present invention to prevent a striking sound of the gears from being generated when the shift change is conducted from the "D" range or the "R" range to the "N" range or the "P" range during stoppage of the electric vehicle.

To achieve the above object, according to the present invention, there is provided a control system for an electric vehicle, comprising a power transmitting mechanism for transmitting a driving force of a motor through a gear to driven wheels, and a shift position detecting means for detecting whether the shift position is a travel range or a stop range. A motor output calculating means is provided for calculating a motor output based on at least an accelerator opening degree when the travel range is detected, and for setting the motor output at zero when the stop range is detected, and a motor control means is provided for controlling the motor based on the motor output. The control system includes a stoppage detecting means for detecting that the vehicle is in its substantially stopped state, a shift change detecting means for detecting that the shift position has been changed from the travel range to the stop range, and a motor output gradually-decreasing means for gradually decreasing the motor output toward zero, when the vehicle is in its substantially stopped state and the shift position has been changed from the travel range to the stop range.

With this type of arrangement, if the shift position is changed from a travel range to a stop range when the vehicle is in its substantially stopped state, the motor output is gradually decreased toward zero. Therefore, the pressure of contact between tooth flanks of the gears of the power transmitting mechanism provided between the motor and the driven wheels can be moderately decreased to prevent the generation of a striking sound due to the repulsion of the gear.

BRIEF DESCRIPTION OF THE DRAWINGS

The above and other objects, features and advantages of the invention will become apparent from the following description of the preferred embodiment taken in conjunction with the accompanying drawings, wherein.

DETAILED DESCRIPTION OF THE PREFERRED EMBODIMENT

The present invention will now be described by way of preferred embodiments with reference to the accompanying drawings.

Figure 1:
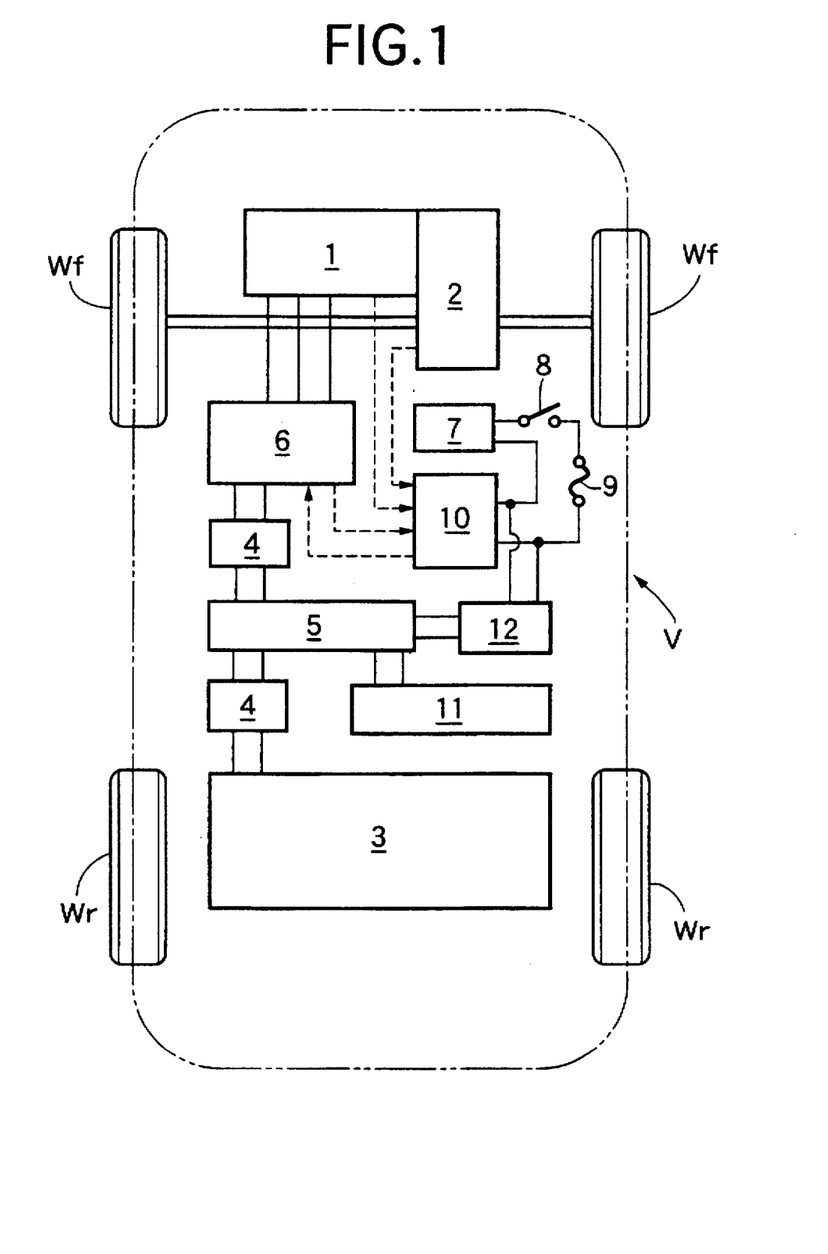
FIG. 1 is a diagrammatic illustration of the entire arrangement of an electric vehicle utilizing the present invention.
Figure 2:
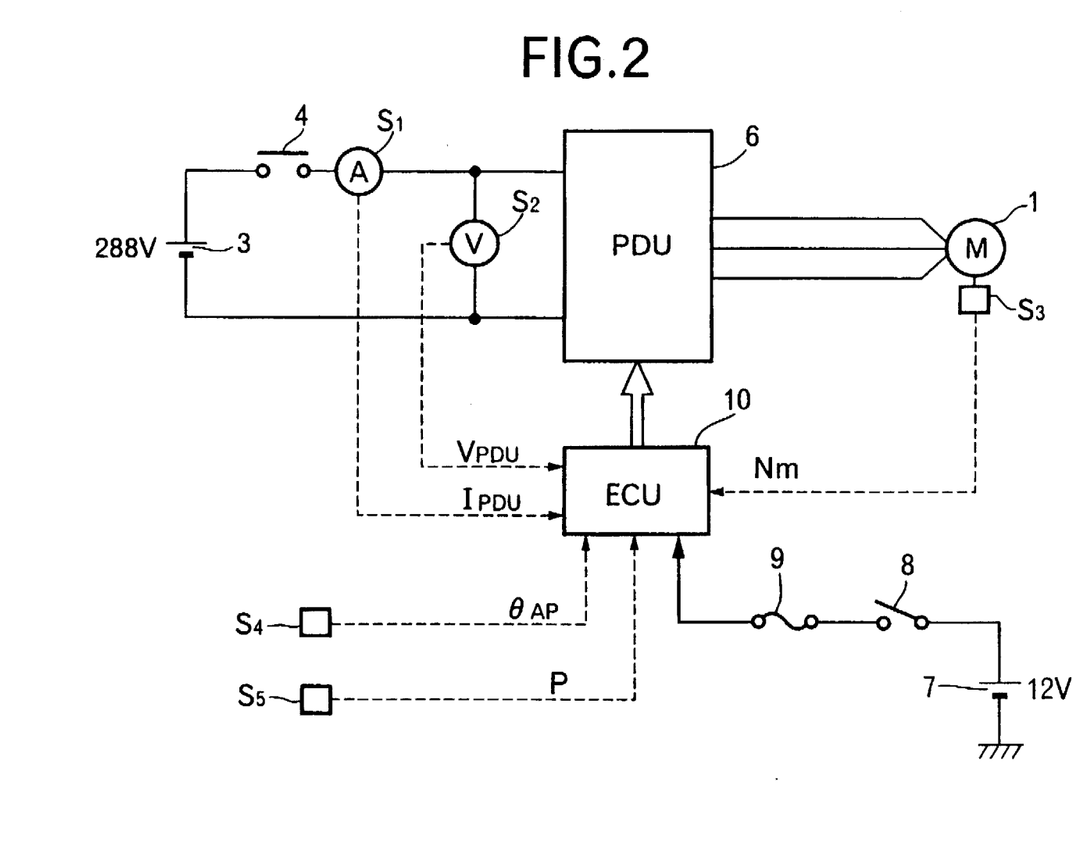
FIG. 2 is a block diagram of a control section of the invention.

Referring to FIGS. 1 and 2, a four-wheel electric vehicle V includes a pair of left and right front wheels Wf, Wf as driven wheels to which a torque of a three-phase AC motor 1 is transmitted through a transmission 2 as a power transmitting mechanism, and a pair of left and right rear wheels Wr, Wr as follower wheels. A main battery 3, for example, of 288 V is mounted at a rear portion of the electric vehicle V and connected to a motor 1 through a contactor 4, a joint box 5, a contactor 4 and an inverter 6 which constitutes a power drive unit. An electronic control unit 10 is connected to a subsidiary battery 7, for example, of 12 V through a main switch 8 and a fuse 9 and is connected to the inverter 6 to control the driving torque and the regenerative torque of the motor 1. In order to charge the subsidiary battery 7 by a power of the main battery 3, a battery charger 11 and a DC/DC converter 12 are provided.

A high-voltage circuit connecting the main battery 3 and the inverter 6 to each other, i.e., a DC section of the inverter 6 is provided with an electric current sensor $S_1$ for detecting an electric current $I_{PDU}$ of the DC section of the inverter 6, and a voltage sensor $S_2$ for detecting a voltage $V_{PDU}$ of the DC section of the inverter 6. The electric current $I_{PDU}$ of the DC section of the inverter 6 detected by the electric current sensor $S_1$ and the voltage $V_{PDU}$ of the DC section of the inverter 6 detected by the voltage sensor $S_2$ are inputted to the electronic control unit 10. A motor revolution-number Nm detected by a motor revolution-number sensor $S_3$, an accelerator opening degree θAP detected by an accelerator opening degree sensor $S_4$ and a shift position P detected by a shift position sensor $S_5$ are also inputted to the electronic control unit 10.

The shift positions P include a "D" range, an "R" range, an "N"range and a "P" range. The "D" and "R" ranges of these ranges constitute a travel range in the present invention, and the "N" and "P" ranges constitute a stop range.

The inverter 6 includes a plurality of switching elements. By inputting a switching signal to each of the switching elements from the electronic control unit 10, a DC power of the main battery 3 is converted into a three-phase AC power and supplied to the motor 1 during driving of the motor 1, and a three-phase AC power generated by the motor 1 is converted to a DC power and supplied to the main battery 3 when the motor 1 is driven (regenerated).

Figure 3:
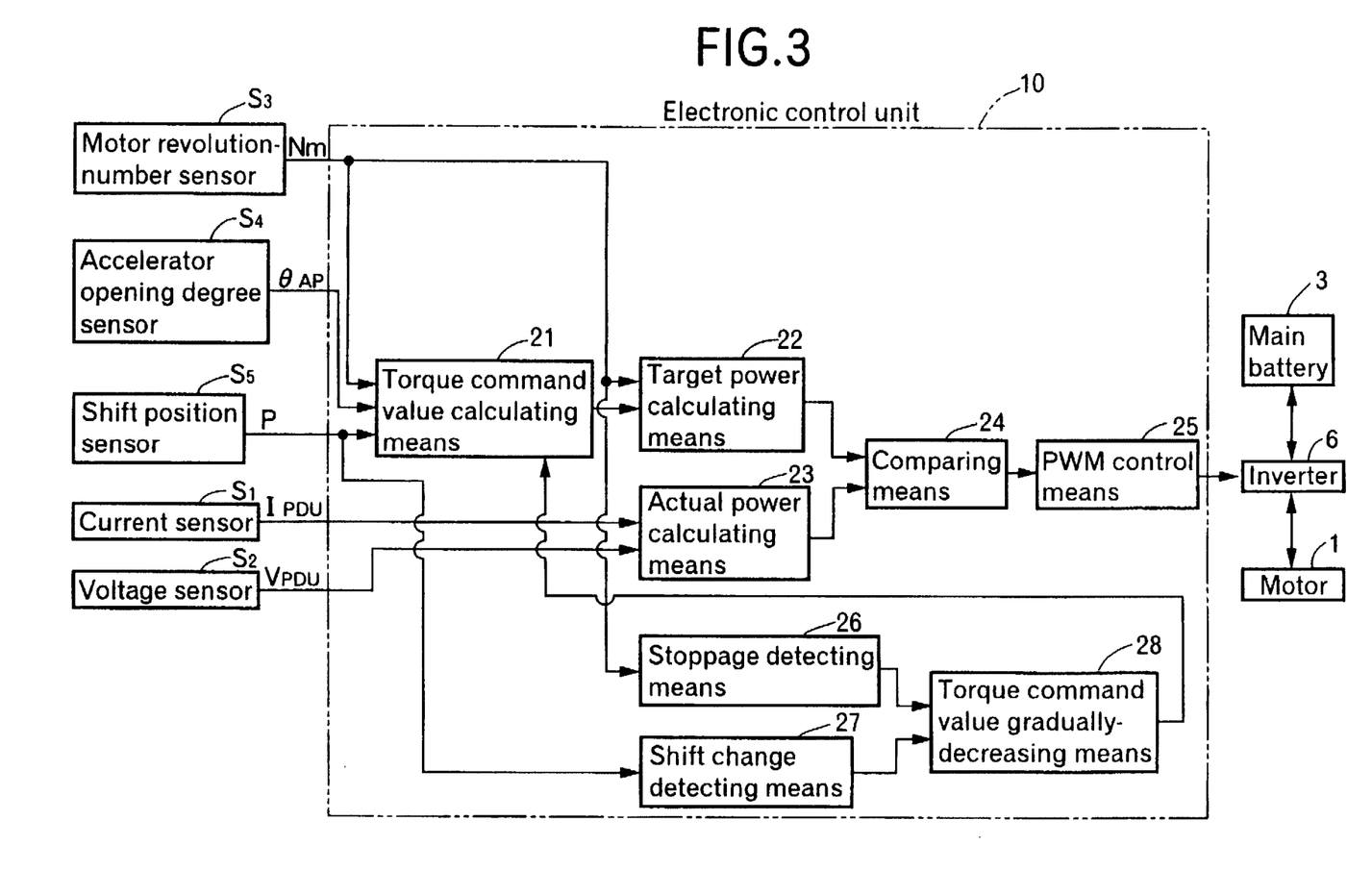
FIG. 3 is a block diagram illustrating a circuit arrangement of an electronic control unit according to the invention.

The circuit arrangement and operation of the electronic control unit 10 will be described below with reference to FIG. 3.

The electronic control unit 10 includes a torque command value calculating means 21 (a motor output calculating means), a target power calculating means 22, an actual power calculating means 23, a comparing means 24, a PWM control means 25 (a motor control means), a stoppage detecting means 26, a shift change detecting means 27 and a torque command value gradually-decreasing means 28 (a motor output gradually-decreasing means).

Figure 5:
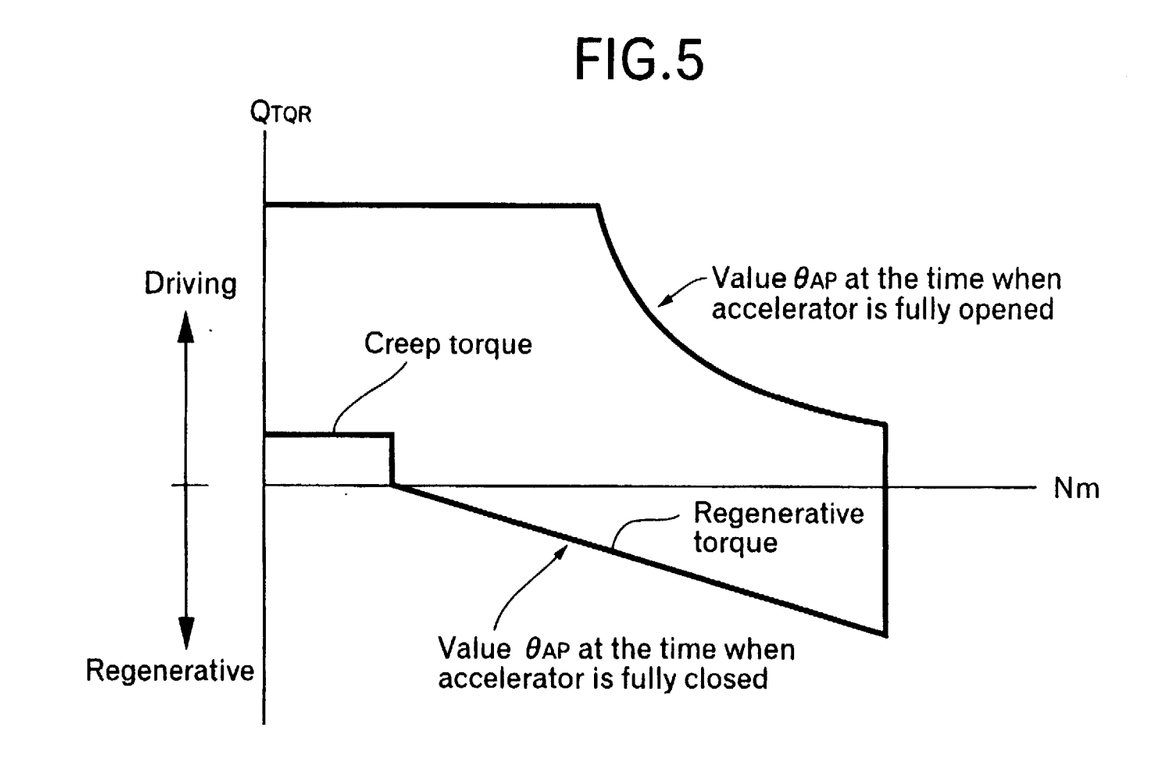
FIG. 5 is a torque map in a travel range.

The torque command value calculating means 21 searches a torque command value $Q_{TRQ}$ intended to be generated in the motor 1 by a driver from the map shown in FIG. 5, based on the motor revolution-number Nm detected by the motor revolution-number sensor $S_3$, the accelerator opening degree θAP detected by the accelerator opening degree sensor $S_4$, and the shift position P detected by the shift position sensor $S_5$. The target power calculating means 22 calculates a target power which is to be supplied to the motor 1 or which is to be taken from the motor 1 by a regenerative operation, by multiplying the torque command value $Q_{TRQ}$ calculated in the torque command value calculating means 21 by the motor revolution-number Nm detected by the motor revolution-number sensor $S_3$. The target power may be a positive value in one case and a negative value in another case. The positive target power corresponds to the case where the motor 1 generates a driving torque, and the negative target power corresponds to the case where the motor 1 generates a regenerative torque.

On the other hand, the actual power calculating means 23 calculates an actual power inputted to the inverter 6 by multiplying the electric current $I_{PDU}$ of the DC section of the inverter 6 detected by the electric current sensor $S_1$ by the voltage $V_{PDU}$ of the DC section of the inverter 6 detected by the voltage sensor S2. As is the target power, the actual power may be a positive value in one case and a negative value in another case. The positive actual power corresponds to the case where the motor 1 generates a driving torque, and the negative target power corresponds to the case where the motor 1 generates a regenerative torque.

The target power calculated in the target power calculating means 22 and the actual power calculated in the actual power calculating means 23 are inputted to the comparing means 24, where a deviation between the target power and the actual power is calculated. The PWM control means 25 PWM-controls the inverter 6 based on this deviation. As a result, the operational state of the motor 1 is controlled in a feedback manner in order to allow the actual power to be equalized to the target power.

The stoppage detecting means 26 detects that the vehicle is in its substantially stopped state, based on the motor revolution-number Nm detected by the motor revolution-number sensor $S_3$ and particularly, when the motor revolution-number Nm is equal to or smaller than an extremely small predetermined value. The shift change detecting means 27 detects a shift change from the travel range (the "D" and "R" ranges) to the stop range (the "N" and "P" ranges) based on the shift position P detected by the shift position sensor $S_6$.

The torque command value gradually-decreasing means 28 gradually decreases the torque command value calculated in the torque command value calculating means 21 toward zero, when the stoppage detecting means 26 has detected the fact that the vehicle is in its substantially stopped state, and the shift change detecting means 27 has detected the shift change from the travel range to the stop range.

Figure 4:
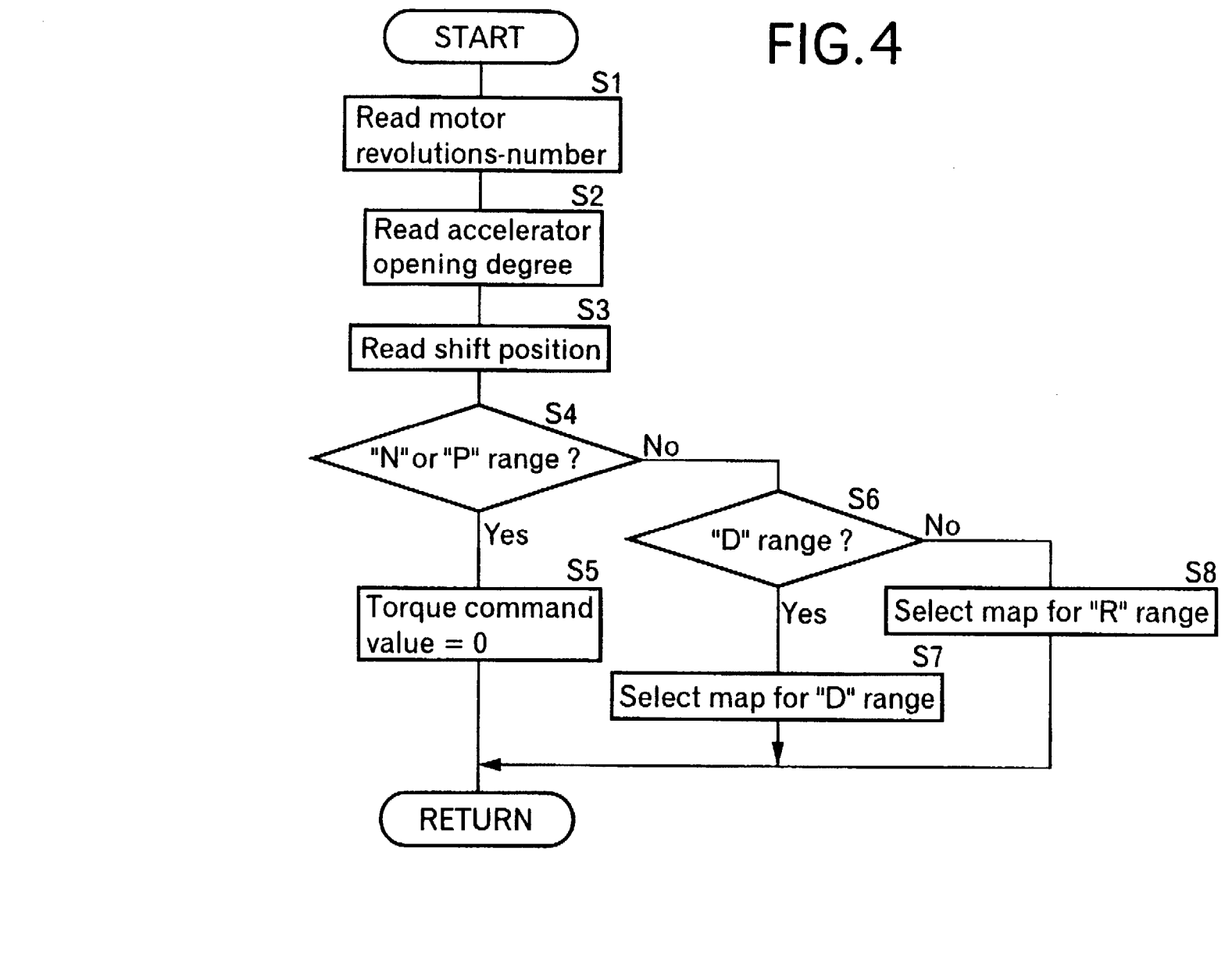
FIG. 4 is a flow chart of a torque command value calculating routine according to the invention.

A torque command value calculating routine carried out in the torque command value calculating means 21 will be described below with reference to the flow chart shown in FIG. 4.

First, at steps S1 to S3, a motor revolution-number Nm, an accelerator opening degree θAP, and a shift position P are read from the motor revolution-number sensor S3, the accelerator opening degree sensor $S_4$, and the shift position sensor $S_5$, respectively. If the shift position P is the stop range (the "N" or "P" range) at step S4, the torque command value $Q_{TRQ}$ is set at zero at step S5. If the shift position P is the "D" range at steps S4 and S6, the torque command value $Q_{TRQ}$ is searched from the torque map for the "D" range at step S7. If the shift position P is the "R" range at steps S4 and S6, the torque command value $Q_{TRQ}$ is searched from the torque map for the "R" range at step S8.

As shown in FIG. 5, the torque map for the "D" or "R" range (i.e., the torque map for the travel range) is established in accordance with the accelerator opening degree θAP. The torque command value $Q_{TRQ}$ at the time when the accelerator opening degree θAP is a value at the time when the accelerator is fully opened is set so that it is maintained at a given value in a smaller motor revolution-number range and decreased in a secondary function manner in accordance with an increase in motor revolution-number in a larger motor revolution-number range. The torque command value $Q_{TRQ}$ at the time when the accelerator opening degree θAP is a value at the time when the accelerator is fully closed is set so that it is set at a given creep torque in the smaller motor revolution-number range and increased linearly in accordance with an increase in motor revolution-number in the larger motor revolution-number range.

Figure 6:
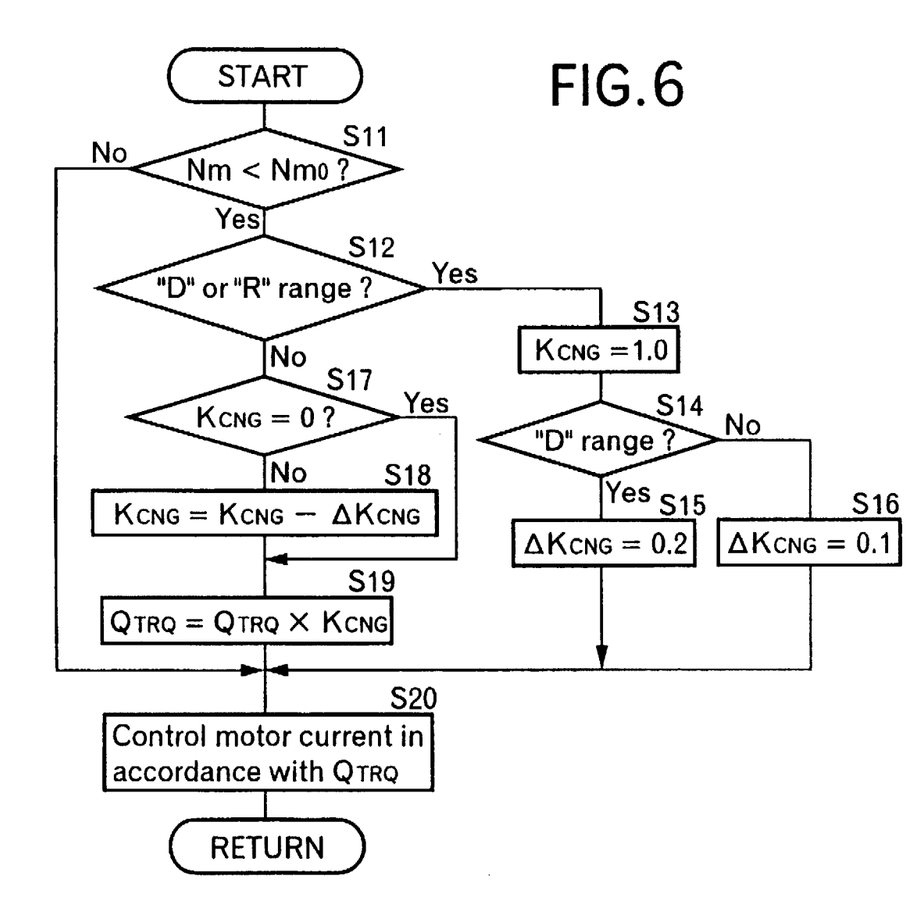
FIG. 6 is a flow chart of a torque command value gradually-decreasing routine according to the invention.

A torque command value gradually-decreasing routine mainly carried out in the stoppage detecting means 26, the shift change detecting means 27 and the torque command value gradually-decreasing means 28 will be described with reference to the flow chart shown in FIG. 6.

First, at step S11, a motor revolution-number Nm is compared with a predetermined reference value $Nm_0$. If $Nm < Nm_0$ at step S11 to indicate that the vehicle is in its substantially stopped state, then it is determined at step S12 whether the shift position is the travel range. If the shift position is the travel range, the torque command value decreasing factor $K_{CNG}$ is set at an initial value of 1.0 at step S13. If the shift position is the "D" range of the travel range at next step S14, the torque command value decreasing rate $\Delta K_{CNG}$ is set at 0.2 at step S15. If the shift position is not the "D" range in the travel range and is the "R" range, the torque command value decreasing rate $\Delta K_{CNG}$ is set at 0.1.

When the driver has switched over the shift position from the travel range to the stop range, the answer at step S12 becomes NO, advancing to step S17. If the torque command value decreasing factor $K_{CNG}$ is not decreased down to zero at step S17, a value resulting from subtraction of the torque command value decreasing rate $\Delta K_{CNG}$ (0.2 or 0.1) from the torque command value decreasing factor $K_{CNG}$ is defined as a new torque command value decreasing factor $K_{CNG}$ at step S18. As apparent from FIG. 7, when the shift position has been switched over from the travel range to the stop range, the torque command value decreasing factor $K_{CNG}$ is decreased by 0.2 for every loop from the initial value of 1.0 if the shift position is the "D" range, and the torque command value decreasing factor $K_{CNG}$ is decreased by 0.1 for every loop from the initial value of 1.0 if the shift position is the "R" range.

When the torque command value decreasing factor $K_{CNG}$ has been determined in the above manner, the torque command value $Q_{TRQ}$ searched in the torque command value calculating means 21 is multiplied by the torque command value decreasing factor $K_{CNG}$ determined at step S18, and a resulting value is defined as a torque command value $Q_{TRQ}$ after correction. Thus, the motor 1 is controlled based on such torque command value $Q_{TRQ}$ at step S20. That is, the torque command value $Q_{TRQ}$ and the motor revolution-number Nm are multiplied by each other to calculate a target power in the target power calculating means 22, while the electric current $I_{PDU}$ and the voltage $V_{PDU}$ are multiplied by each other to calculate an actual power in the actual power calculating means 23. These target and actual powers are inputted to the comparing means 24, where a deviation is calculated, and the PWM control means 25 PWM-controls the inverter 6 based on this deviation. As a result, the operational state of the motor 1 is controlled in the feedback manner to allow the actual power to be equalized to the target power.

Figure 7:
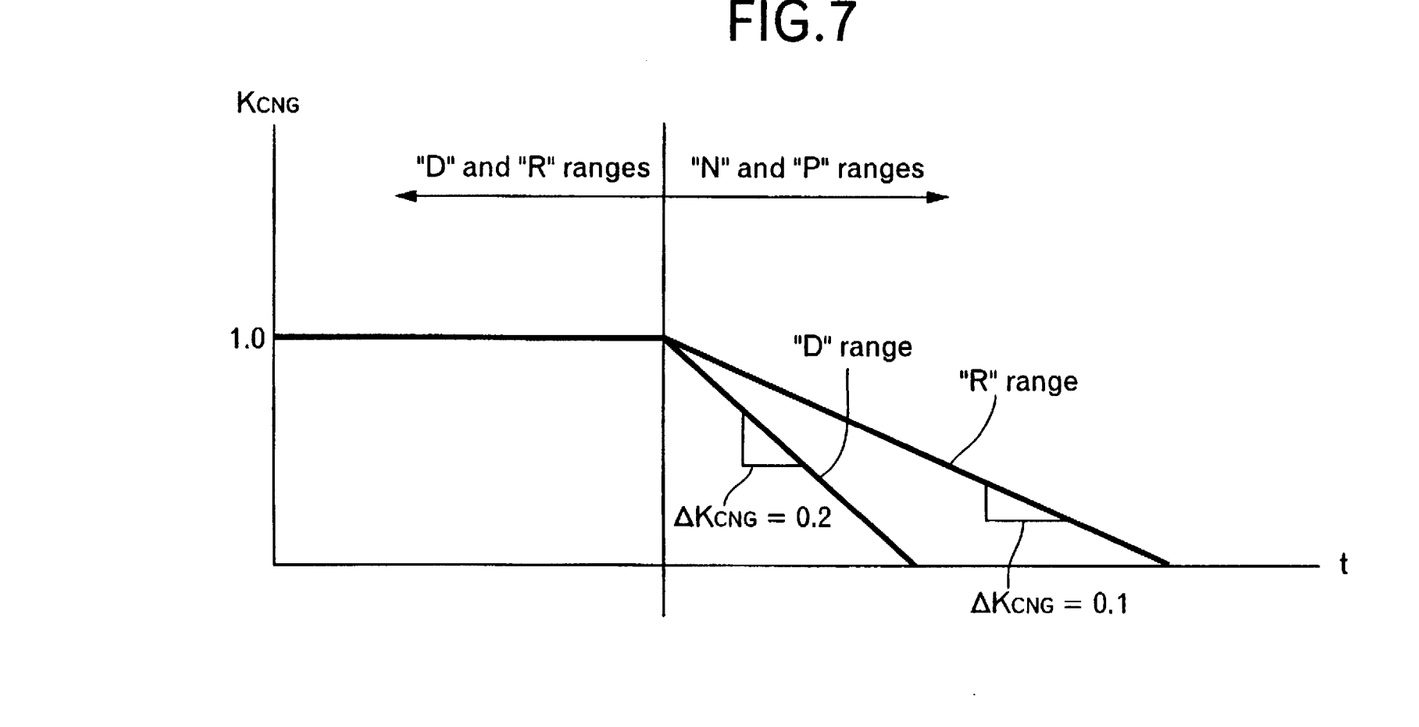
FIG. 7 is a graph illustrating the variation in torque command value according to the invention.

Thus, even if the driver has switched over the shift position from the travel range to the stop range when the vehicle is in its substantially stopped state, the torque command value $Q_{TRQ}$ cannot be sharply decreased to zero and is gradually decreased from the initial value to zero in accordance with the torque command value decreasing rate $\Delta K_{CNG}$ shown in FIG. 7. This causes the torque of a driving gear of a power transmitting mechanism such as the transmission 2 in a direction of an arrow A to be decreased moderately in FIG. 8A and, therefore, the driving gear is suddenly pushed back in a direction of an arrow B in FIG. 8C by a reaction force from a follower gear to prevent the generation of a striking sound.

Although the present invention has been described in detail, it will be understood that the present invention is not limited to the above-described embodiments, and various modifications may be made without departing from the spirit and scope of the invention defined in claims.

For example, in the disclosed embodiment, it is detected based on the motor revolution-number Nm that the vehicle is in its substantially stopped state, but such detection may be based on a vehicle speed. In addition to the motor revolution-number Nm and/or the vehicle speed, a brake switch adapted to be turned ON upon depression of a brake pedal may be used.

Furthermore, the electronic control unit 10 including torque command value calculating means 21, target power calculating means 22, actual power calculating means 23, comparing means 24, PWM control means 25, stoppage detecting means 26, shift change detecting means 27, torque command value decreasing means 28, and possibly other elements can be embodied on a microprocessor which is programmed to include the various means and thereby to perform the various functions, or can be embodied as discrete hardware elements configured to cooperate to form a ECU 10 and to thereby perform the control functions disclosed in the present specification. Other embodiments may also be available to a person of skill in the art, depending upon a desired level of customization and integration.

What is claimed is:

1. A control system for an electric vehicle, comprising:
   a power transmitting mechanism for transmitting a driving force of a motor through a first gear to driven wheels;
   a shift position detecting means for detecting whether a shift position is a travel range or a stop range;
   motor output calculating means for calculating a motor output based on at least an accelerator opening degree when the travel range is detected, and for setting the motor output at zero when the stop range is detected;
   motor control means for controlling the motor based on said motor output;
   stoppage detecting means for detecting that the vehicle is in its substantially stopped state;
   shift change detecting means for detecting that the shift position has been changed from the travel range to the stop range; and
   motor output gradually decreasing means for gradually decreasing said motor output toward zero when the vehicle is in its substantially stopped state and the shift position has been changed from the travel range to the stop range.

2. A control system according to claim 1, wherein said motor output gradually decreasing means operates to control a pressure of contact between teeth of the first gear and teeth of a second gear of the power transmitting mechanism.

3. A control system according to claim 2, wherein said pressure of contact is gradually decreased to reduce a striking sound generated by the first gear and the second gear of said power transmitting mechanism.

4. A method for controlling an electric vehicle, said method comprising the steps of:

providing an electric vehicle having a power transmitting mechanism for transmitting a driving force of a motor through a first gear to driven wheels, with a shift position detecting means for detecting whether the shift position is a travel range or a stop range, and a motor output calculating means for calculating a motor output based at least upon an accelerator opening degree when the travel range is detected, and for setting the motor output at zero when the stop range is detected, and a motor control means for controlling the motor based upon said motor output, said method further comprising the steps of:

detecting that the vehicle is in a substantially stopped state;

detecting a change of a shift position from the travel range to the stop range; and gradually decreasing the motor output toward zero when the vehicle is in a substantially stopped state and the shift position has been changed from the travel range to the stop range.

5. A method for controlling an electric vehicle as recited in claim 4, wherein said step of gradually decreasing said motor output includes the step of gradually decreasing a pressure of contact between the first gear and a second gear of the power transmitting mechanism.

6. A method for controlling an electric vehicle as recited in claim 5, wherein said step of gradually reducing the pressure of contact reduces a striking sound between the first gear and the second gear when the shift position has been changed from the travel range to the stop range.

7. A control system for an electric vehicle, said control system comprising:

a power transmitting mechanism for transmitting a driving force of a motor through a first gear to driven wheels;

a shift position detecting means for detecting whether a shift position of the power transmitting mechanism is a travel range or a stop range;

a controller connected to said power transmitting mechanism and said shift position detecting means for controlling the power transmitting-mechanism, said controller comprising:

motor output calculating means for calculating a motor output based on at least an accelerator opening degree when the travel range is detected, and for setting the motor output at zero when the stop range is detected;

motor control means for controlling the motor based on said motor output;

stoppage detecting means for detecting that the vehicle is in a substantially stopped state;

shift change detecting means for detecting that the shift position has been changed from the travel range to the stop range; and motor output gradually-decreasing means for gradually decreasing said motor output toward zero, when the vehicle is in its substantially stopped state and the shift position has been changed from the travel range to the stop range.

8. A method as recited in claim 7, wherein said controller is configured to control a pressure of contact between teeth of the first gear and teeth of a second gear of the power transmitting mechanism.

9. A control system according to claim 8, wherein said pressure of contact is gradually decreased to reduce a striking sound generated by the first gear and the second gear of the power transmitting mechanism.

10. A computer program embodied on a computer-readable medium for controlling a power transmitting mechanism on the electric vehicle, said computer program comprising the steps of:

detecting whether a shift position of a power transmitting mechanism is a travel range or a stop range;

calculating a motor output based on at least an accelerator opening degree when the travel range is detected, and setting the motor output at zero when the stop range is detected;

controlling a motor based on the motor output;

detecting that the vehicle is in a substantially stopped state;

detecting that a shift position has changed from the travel range to the stop range; and gradually decreasing the motor output toward zero when the vehicle is in its substantially stopped stage and the shift position has been changed from the travel range to the stop range.

11. A computer program as recited in claim 10, wherein said step of gradually decreasing the motor output includes the step of gradually decreasing a pressure of contact between a first gear and a second gear of the power transmitting mechanism.

12. A computer program as recited in claim 11, wherein said step of gradually reducing the pressure of contact reduces a striking sound between the first gear and the second gear when the shift position has been changed from the travel range to the stop range.

* * * * *